United States Patent [19]
McCann

[11] Patent Number: 5,838,133
[45] Date of Patent: Nov. 17, 1998

[54] SWITCHED RELUCTANCE MOTOR CONTROLLER

[76] Inventor: Roy A. McCann, 3517 Kingswood, Kettering, Ohio 45420

[21] Appl. No.: 856,370

[22] Filed: May 14, 1997

[51] Int. Cl.⁶ ..................................................... H02P 5/05
[52] U.S. Cl. ........................................... 318/701; 318/254
[58] Field of Search ................................... 318/701, 254, 318/138, 439, 610

[56] References Cited

U.S. PATENT DOCUMENTS

| | | |
|---|---|---|
| 4,707,650 | 11/1987 | Bose . |
| 4,739,240 | 4/1988 | MacMinn et al. . |
| 4,943,760 | 7/1990 | Byrne et al. ............................. 318/701 |
| 5,012,171 | 4/1991 | Sember . |
| 5,637,974 | 6/1997 | McCann . |
| 5,663,625 | 9/1997 | Sato et al. ................................ 318/701 |
| 5,691,591 | 11/1997 | McCann ............................. 318/701 X |

OTHER PUBLICATIONS

Optimal Commutation Angles For Current Controlled Switched Reluctance Motors by J.J. Gribble, P.C. Kjaer, C. Cossar & T.J.E. Miller, Dec. 9, 1996.

*Primary Examiner*—Bentsu Ro
*Attorney, Agent, or Firm*—Thomas N. Twomey; J. Gordon Lewis; Margaret A. Dobrowitsky

[57] ABSTRACT

A method and a preferred hardware implementation for selectively energizing a motor winding to maximize its efficiency and output torque under conditions of varying rotor speed, winding temperature, and supply voltage. Motor sensors generate operating condition signals that are transformed by processing circuitry into independent parameters in the translation and dilation domain from which optimal turn-on and turn-off or "conduction angles" are determined. The optimal conduction angles are processed by circuitry to generate actuation signals that selectively control the delivery of energy to the motor winding.

30 Claims, 2 Drawing Sheets

SWITCHED RELUCTANCE MOTOR CONTROLLER

CROSS-REFERENCE TO RELATED APPLICATION

The present invention is related to U.S. patent application Ser. No. 08/841,191, filed Apr. 29, 1997, entitled "Commutation Circuit For Switched—Reluctance Motor" having the same Inventor and Assignee of Interest as this application which is hereby incorporated within this specification by reference.

FIELD OF THE INVENTION

The invention relates to controlling the delivery of power to a switched reluctance motor to maximize its efficiency and output torque by optimizing the phase current turn-on and turn-off or "conduction" angles under conditions of varying rotor speed, winding temperature, and supply voltage.

BACKGROUND OF THE INVENTION

The angular positions of the rotor at which to energize and de-energize the phase windings of the stator in a switched reluctance motor are called "turn-on" and "turn-off" angles or, collectively, the "conduction angles." Schemes exist for selecting the optimal conduction angles that maximize the motor's output torque and operating efficiency despite variation in its instantaneous operating speed are well established in the art of switched reluctance motors. A need still exists, however, to simplify the determination of optimal conduction angles that compensate for variations in rotor speed and to develop practical methods for determining optimal conduction angles that compensate for variations in supply voltage and operating temperature due to changing load conditions and coil resistance. All of these variations produce corresponding variations in the amplitude rise and decay period of the current that runs through the stator's phase windings, the so-called "phase current".

Selection of turn-on and turn-off angles is independent only for the case of low speed motor operation where no significant time delay exists between the instant in time that the phase current is turned-on and when it reaches its maximum phase current value, and between the instant in time that the phase current is turned-off and when it reaches a zero value, i.e., "flat top current control." Traditional control schemes that optimize output torque and motor efficiency for higher and variable speed motor operation employ lengthy look-up tables that require the processing power of a micro-controller to access. In addition, the highly coupled relationship between the turn-on and turn-off angles in traditional schemes that compensate for variations in coil resistance and supply voltage further complicates the determination of optimal conduction angles. The current invention provides a simplified method for determining optimized conduction angles that can be used to determine optimal conduction angles under varying operating conditions based upon defining a set of independent parameters.

SUMMARY OF THE INVENTION

The present invention is a method and a preferred hardware implementation for selectively energizing a motor winding. The invention uses motor sensors to generate motor operating condition signals that are transformed by processing circuitry into the translation and dilation domain in which optimal conduction angles are determined. The optimal conduction angles are processed by circuitry that generates actuation signals to selectively control the delivery of energy to the motor winding.

DETAILED DESCRIPTION OF THE PREFERRED EMBODIMENT

Figure 1:
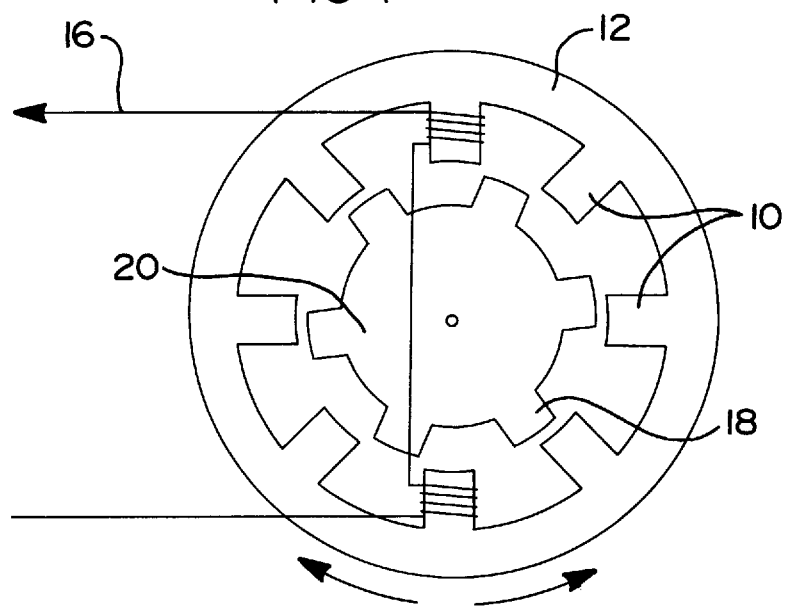
FIG. 1 is a partial cross-sectional view of a switched reluctance motor.

Referring to FIG. 1, the method of the present invention is explained using a four-phase switched reluctance motor as the preferred embodiment. Each pair of diametrically opposite teeth or poles 10 on the stator 12 of the motor 14 is connected by a winding to form one "phase" 16 of the four phases in the motor 14. The poles 18 on the rotor 20 have no windings. The output torque is produced by sequentially switching current through each of the stator phase windings 16. The magnetic field resulting in each energized stator phase winding 16 magnetically attracts the stator's nearest neighboring rotor pole 18 causing the rotor 20 to rotate. To prevent any repulsion or "braking torque" from being produced when the rotor pole 18 rotates past the angular position in which it becomes aligned with the attracting stator pole 12, the stator's phase current is switched off as the rotor 20 approaches the aligned position. Once the angular momentum of the rotor 20 has caused it to rotate past the aligned position, the phase current may be switched on again to produce more output torque.

The output torque and operating efficiency of a switched reluctance motor 14 may be maximized by optimizing the magnitude of the current in each stator phase winding 16 during the portion of the switching cycle in which the inductance of the windings 16 increase. The electrical dynamics of a switched reluctance motor 14 can be characterized by an equivalent circuit based on a linear relationship between the current flowing through the phase winding 16 and the magnetic flux linked by that winding 16

$$\lambda(\theta,i) = L(\theta)i(t) \tag{1}$$

where $\theta$ is the flux linkage, I(t) is the phase current, and $\theta$ is the angular position of the rotor 18. The voltage relationship at the phase terminal is:

$$v(t) = i(t)R + \frac{d\lambda}{dt} \tag{2}$$

where v(t) is the applied phase voltage from the motor's drive circuit. Evaluating the derivative yields:

$$v(t) = i(t)R + L(\theta)\frac{di}{dt} + i(t)\frac{dL}{d\theta}\frac{d\theta}{dt} \tag{3}$$

Noting that the rotor speed T is the time derivative of the rotor position, equation (3) may be written as:

$$v(t) = i(t)R + L(\theta)\frac{di}{dt} + i(t)\frac{dL}{d\theta}\omega \tag{4}$$

Figure 2:
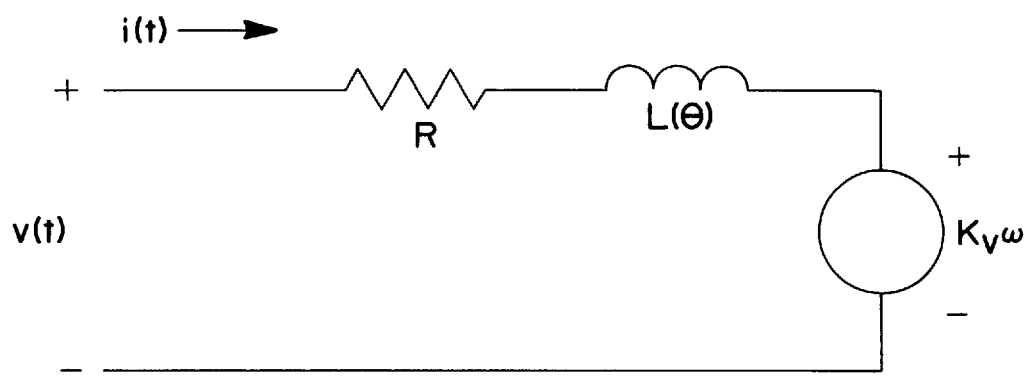
FIG. 2 is a schematic representation of an equivalent circuit for a stator phase winding.

FIG. 2 depicts an equivalent series electrical circuit modeling the characteristics of a stator winding 18 based on the voltage relationship given in equation (4). In FIG. 2 $K_V$ is a voltage parameter or "back emf constant" related to the variation of the inductance in the circuit as a function of the angular position of the rotor 20:

$$K_V = i(t)\frac{dL}{d\theta} \qquad (5)$$

The resulting electromagnetic torque is approximately:

$$T = \frac{1}{2} K_V i(t) \qquad (6)$$

Thus, the motor torque is usually related directly to $K_V$. From the previous description, it should be noted that positive torque is produced when the inductance is increasing ($dL/d2\_>\_0\_$) and current is conducting through the phase winding 16. In general, the relationship given in equation (6) varies with the motor phase conduction period, the period of time during which I(t) is nonzero. Thus, the torque expression could also be written as:

$$T = K_T i(t) \qquad (7)$$

It should be noted that equations (1)–(6) are written for a single phase. Most switched reluctance motors 14 are designed such that there is no mutual coupling between phases.

By modifying the conduction period or the range of rotor positions for which I(t) is nonzero, the values of $K_V$ and $K_T$ can be varied. In general, it is found that reducing $K_V$ (if $K_T$ were constant) increases the maximum power available from the output shaft of the motor 14 but reduces the overall efficiency of the motor 14 due to increased resistance losses. Conversely, increasing $K_T$ (while $K_V$ remains constant) minimizes the power consumption of the motor 14 but provides more torque to the motor's load. Controlling the motor by modifying the conduction period is desirable but difficult in practice because $K_T$ and $K_V$ each vary with any variation of the conduction period, which is determined from the turn-on and turn-off angles. This invention defines a transformation that allows $K_V$ and $K_T$ to be determined independently. A transformation is defined between the phase turn-on and turn-off angles used by the motor's drive circuit to control the delivery of energy to the motor 14 and a new set of variables that modify $K_T$ and $K_V$:

$$K_T = \hat{K}_T \delta$$
$$K_V = \hat{K}_V \tau \qquad (8)$$

This transform allows the designer to determine $K_T$ and $K_V$ independently through the use of controlled variables * and σ where: 1) dilation * is the conduction angle duration in radians, which correlates directly to the motor's output torque; and 2) translation σ is the phase advance of the conduction period in radians, which correlates directly to the motor's efficiency.

In general the transformation is defined as:

$$\begin{bmatrix} \delta \\ \tau \end{bmatrix} = \begin{bmatrix} -1 & 1 \\ 1/2 & 1/2 \end{bmatrix} \begin{bmatrix} \theta_{on} \\ \theta_{off} \end{bmatrix}$$

The inverse transformation is:

$$\begin{bmatrix} \theta_{on} \\ \theta_{off} \end{bmatrix} = \begin{bmatrix} -1/2 & 1 \\ 1/2 & 1 \end{bmatrix} \begin{bmatrix} \delta \\ \tau \end{bmatrix}$$

Although many transformation value sets may defined that are suitable for a variety of applications and motor configurations, one particularly useful set for the switched reluctance motor 14 is defined as:

$$\begin{bmatrix} \delta \\ \tau \end{bmatrix} = \begin{bmatrix} -1 & 1 \\ 1/2 & 1/2 \end{bmatrix} \begin{bmatrix} \theta_{on} \\ \theta_{off} \end{bmatrix}$$

Having an inverse transformation of:

$$\begin{bmatrix} \theta_{on} \\ \theta_{off} \end{bmatrix} = \begin{bmatrix} -1/2 & 1 \\ 1/2 & 1 \end{bmatrix} \begin{bmatrix} \delta \\ \tau \end{bmatrix}$$

This transform maps the coordinates of the conduction angles in the 2 on/off plane into the *σ plane using eigenvectors $[-0.96, 0.27]^{-\sigma}$ and $[-0.49, 0.97]^\sigma$. The conduction angles can be optimized in the *σ plane for the preferred embodiment (described below with reference to FIG. 5) to compensate for variations in the motor's operating speed, temperature, and supply voltage using only the 10 parameters (K1 ... K10, as defined in equation (13)). In contrast, conventional methods of optimizing conduction angles that compensate for variations in only motor speed require microprocessor-based technology for accessing look-up tables that may be up to 1200 entries long. Although many hardware designs of the present invention's simple optimizing method may designed, one advantageous implementation uses primarily using analog and/or discrete logic technology to avoid more costly microprocessor-based control methods. The design method of the present invention is particularly advantageous in applications where the motor 14 is a servomechanism that operates in two distinct modes: 1) the motor 14 accepts low frequency torque command signals under conditions that require minimum power dissipation and maximum efficiency (i.e., "normal" operation); and 2) The motor must respond to large variations in torque and velocity command signals having relatively high frequencies without regard to efficiency or power consumption ("emergency" operation).

Figure 3:
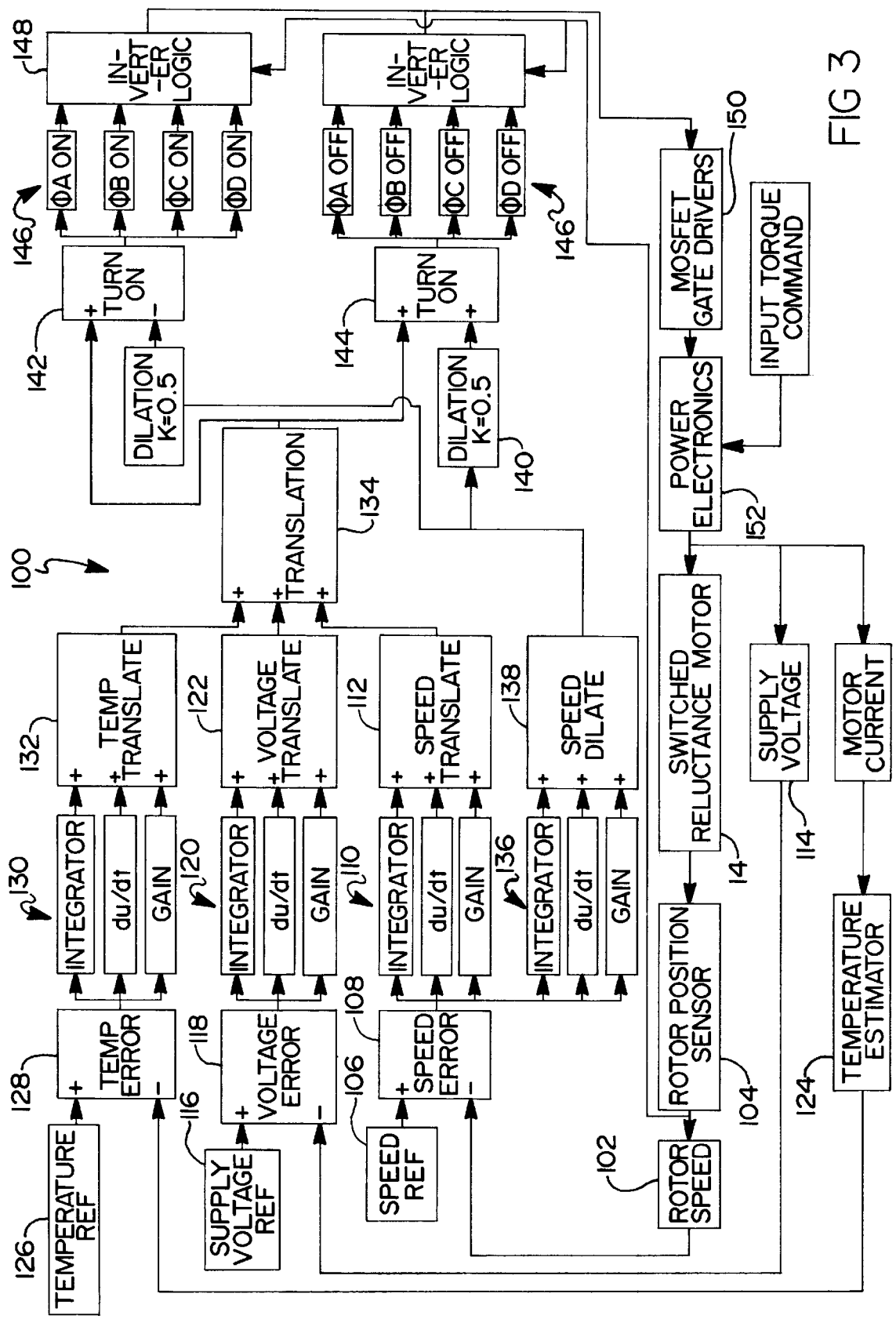
FIG. 3 is a block diagram representing the operation of the switched reluctance motor controller.

The operation of the preferred embodiment of a controller 100 implementing the method of the present invention will now be explained by referring to FIG. 3. Assume that the switched reluctance motor 14 is initially operating at a speed dependent upon load conditions. A voltage signal representing the motor's instantaneous rotor speed 102 obtained by numerically differentiating a pulse train output by rotor position sensor 104 and a voltage signal representing a reference speed 106 generated by a constant voltage source are provided as inputs to a difference amplifier that generates a voltage signal representing the motor's speed error 108. The speed error signal 108 is fed to the inputs of an analog proportional-integral-differential (PID) controller 110 that outputs a voltage signal representing the portion of the translation that compensates for variations in operating speed, the speed translate term 112.

A voltage signal from the motor's instantaneous supply voltage 114 and a reference supply voltage 116 generated by a constant voltage source are provided as inputs to a difference amplifier that generates a voltage signal representing the motor's supply voltage error 118. The supply voltage error signal 1 18 is fed to the inputs of an analog proportional-integral-differential (PID) controller 120 that outputs a voltage signal representing the portion of the translation that compensates for variations in supply voltage, the voltage translate term 122.

A voltage signal representing the temperature of the rotor 16 obtained from a temperature sensing element 124 and a reference temperature voltage 126 generated by a constant voltage source are provided as inputs to a difference amplifier that generates a voltage signal representing the motor's temperature error 128. The temperature voltage error signal 128 is fed to the inputs of an analog proportional-integral-differential (PID) controller 130 that outputs a signal representing the portion of the translation that compensates for variations in the resistance of the rotor 16 due to temperature variations, the temperature translate term 132. Due to the slow dynamics associated with temperature transients, however, only the proportional or gain component of the PID controller 130 needs to be applied to the temperature error signal 128 to produce the temperature translate term 132. The preferred embodiment uses a positive coefficient device from National Semiconductor's KTY82-2 as the temperature sensing element 124. This device uses a mathematical model of the thermal capacitance of the motor and measurements of the electrical energy dissipation ($I^2R$ losses) and the motor's ambient temperature to estimate the temperature rise in the stator windings 16.

The speed 112, voltage 122, and temperature 132, translate term signals are provided as inputs to a difference amplifier that generates a voltage signal representing the translation parameter 134, which may be represented mathematically by the expression:

$$v_\tau = K_1 e_\gamma + K_2 e_v + K_3 \frac{de_v}{dt} + K_4 \int_0^t e_v(\xi)d\xi +$$

$$K_5 e_\omega + K_6 \frac{de_\omega}{dt} + K_7 \int_0^t e_\omega(\xi)d\xi$$

The voltage signal representing the motor speed error 108 is also fed to the inputs of an analog proportional-integral-differential (PID) controller 136 that outputs a voltage signal representing the speed dilate term 138. The dilation parameter 140 is obtained by reducing the voltage signal representing the speed dilate term 138 through an operational amplifier having a gain of 0.5. The voltage signal representing the reduced dilation parameter 140 may be represented mathematically by the expression:

$$v_\delta = K_8 e_\omega + K_9 \frac{de_\omega}{dt} + K_{10} \int_0^t e_\omega(\xi)d\xi$$

The constants $K_1, \ldots, K_{10}$ in equations 13 and 14 determine the dynamic response of the controller 100 to transients. These K parameters are design variables that may be varied to impart different operating characteristics to the various switched reluctance motor arrangements (e.g., three phase 6/4 stator-rotor poles, four phase 8/6 stator-rotor poles, . . . ).

In the preferred embodiment, Burr-Brown IN177A difference amplifiers are used to generate the speed 108, voltage 118, and temperature 128 error signals and the translation 134 and dilation 138 parameters. Speed 110, supply voltage 120, and temperature 130 PID controllers are implemented using Analog Devices' AD22050 operational amplifiers in which supply voltage saturation operates to limit the amount of translation or phase advance that occurs in the circuit. The dilation parameter 140 is generated using a National Semiconductor LM 169 operational amplifier having a fixed gain of 0.05.

The translation 134 and dilation 140 parameters are input to turn-on 142 and a turn-off 144 digital logic circuits. Turn-on 142 and turn-off 144 digital logic circuits may be implemented with differential amplifiers using methods well-known in the art to output voltage signals representing the Phase A turn-on and turnoff angles. These nominal conduction angle signals are fed to multiple phase-shifting circuits 146 that shift the phase of each of the signals with respect to the rotor speed voltage signal 102 to output a series of voltage signals representing turn-on and turn-off angles for each of the four phases of the switched reluctance motor 14 (according to the number of said multiple stator poles). The phase-shifting circuits 146 and the inverter logic circuits 148 may be implemented by a variety of methods well known in the art using in art, one preferred method uses an inexpensive embedded 8-bit micro-controller such as a Motorola HC11 with a multiplexed analog-to-digital module. To perform the phase-shifting function of circuits 146, the output voltages signals from the turn-on 142 and turn-off 144 digital logic circuits are converted to a hexadecimal integer (e.g., 01h to C0h). For example, if the four phase switched reluctance motor 14 had an optimal Phase A turn-on angle value of hexadecimal 01h corresponding to an optimal Phase A turn-off angle value of hexadecimal 30h for low speed operation at nominal voltage and temperature conditions. The value of the Phase B turn-on angle of the four phase switched reluctance motor 14 are determined by adding (if clockwise rotation of the rotor 18 is desired) or subtracting (if counterclockwise rotation of the rotor 18 is desired) 90 electrical degrees or hexadecimal value 60h. The value of Phase C and D turn-on angles and the values of the turn-off angles are computed in a similar.

The HC11 microprocessor generates the rotor speed signal 102 by numerically differentiating a pulse train coming from the rotor position sensor 104. The expression T(n)=h (2(n)-2(n-1)) where 2(n)-2(n-1) is used to define the number of encoder pulses that occur during the time sampling interval $h^{-1}$.

The HC11 microprocessor also runs an interrupt service routine that triggers an interrupt signal at each transition pulse from the incremental rotor position sensor 104. This interrupt signal increments a position counter that cycles from 01h to C0h for clockwise rotation of the rotor 18 or from C1h to 01h for counterclockwise rotation of the rotor 18. At each counter cycle, the inverter logic circuitry 148 performs a logical comparison between each of the turn-on and turn-of angle values and the signal value sent by the incremental rotor position 104. When these two values are equal, the comparison circuitry within inverter logic circuitry 148 generates an enable signal to the MOSFET Gate Drive circuitry 150, which actuates or controls the delivery of current to each of the phases in the switched reluctance motor 14 by the power supply electronics 152. As operating conditions change, optimum conduction angles are continuously redetermined and updated.

Controllers for various configurations of switched reluctance motors having any number of phases may be implemented using the disclosed new and innovative method of determining optimal conduction angles. Alternative implementations and minor variations of the disclosed preferred embodiment will be apparent to those skilled in the art and may still properly fall within the scope of the following claims.

I claim:

1. A method of selectively energizing a motor winding, comprising the steps of:

providing a speed sensor that generates a speed signal representing the angular speed of a rotating member;

determining translation and dilation parameters based upon said speed signal;

providing circuitry that outputs a conduction angle signal representing the substantially optimal angular position of said rotating member at which to selectively control the delivery of energy to said winding based upon said translation and dilation parameters; and controlling selectively the delivery of energy to said winding based upon said conduction angle signal.

2. The method of claim 1, said providing circuitry step comprising, providing circuitry that outputs a pair of conduction angle signals that are based upon said translation and dilation parameters and represent substantially optimal angular positions of said rotating member at which to selectively energize and de-energize said winding.

3. The method of claim 2, said controlling selectively step comprising:

selectively energizing said winding at a first one of said substantially optimal angular positions of said rotating member; and selectively de-energizing said winding at a second one of said angular positions of said rotating member.

4. The method of claim 3, further comprising the step of controlling the delivery of power to successively energize and de-energize said winding.

5. The method of claim 3, further comprising the step of decoding said multiple first and second phase-shifted conduction angle signals to form multiple first and second conduction angle voltage signals.

6. The method of claim 2, further comprising the step of shifting the phase of said conduction angle signals by multiple predetermined measures to form multiple phase-shifted conduction angle signals.

7. The method of claim 6, further providing the step of conditioning at least one of said multiple phase-shifted conduction angle signals to operate a power circuit.

8. The method of claim 6, further comprising the step of decoding said multiple phase-shifted conduction angle signals to form multiple conduction angle voltage signals.

9. The method of claim 1, further comprising the steps of:

comparing said speed signal to a speed reference signal to determine a speed error signal; and processing said speed error signal to produce said translation and dilation parameters.

10. The method of claim 9, said processing step comprising, processing said speed error signal to develop said translation and dilation parameters.

11. A method of selectively energizing multiple stator pole windings of a switched reluctance motor, comprising the steps of:

providing a speed sensor that outputs a rotor speed signal representing rotor speed and a temperature sensor that outputs a rotor temperature signal representing rotor temperature;

deriving temperature and speed terms from said rotor speed and rotor temperature signals and a voltage term based upon the supply voltage;

determining a translation parameter based upon said temperature, speed, and voltage terms;

determining a dilation parameter based upon said rotor speed signal;

providing circuitry to output a signal representative of the substantially optimal angular position of the rotor at which to selectively control the delivery of energy to said stator pole windings based upon said translation and dilation parameters; and controlling selectively the delivery of energy to at least one of said stator pole windings at said substantially optimal angular position of said rotor.

12. The method of claim 11, said providing circuitry and controlling selectively steps comprising:

providing circuitry to output a first conduction angle signal representative of the substantially optimal angular position of said rotor at which to selectively energize said stator pole windings based upon said translation and said dilation parameters;

providing circuitry to output a second conduction angle signal representative of the substantially optimal angular position of said rotor at which to selectively de-energize said stator pole windings based upon said translation and dilation parameters;

selectively de-energizing said stator pole windings at said substantially optimal angular position of said rotor; and selectively de-energizing said stator pole windings at said angular position of said rotor.

13. The method of claim 12, further comprising the step of shifting the phase of said first and second conduction angle signals by multiple predetermined measures to form multiple first and second phase-shifted conduction angle signals.

14. The method of claim 13, further providing the step of conditioning said phase-shifted conduction angle signals to operate a power circuit.

15. The method of claim 11, further comprising the step of controlling the delivery of power to successively energize individual stator pole windings.

16. The method of claim 11, said deriving step comprising:

comparing said rotor speed signal to a speed reference signal to determine a speed error signal;

comparing said supply voltage to a voltage reference signal to determine a voltage error signal;

comparing said rotor temperature signal to a temperature reference signal to determine a temperature error signal; and summing said speed, temperature and voltage error signals to produce said translation parameter.

17. The method of claim 16, said determining a translation parameter step comprising:

processing said speed error signal to develop said speed term;

processing said voltage error signal to develop said voltage term; and processing said temperature error signal to develop said temperature term.

18. The method of claim 16, said determining a dilation parameter step comprising:

processing said speed error signal to develop a speed dilate term; and amplifying said speed dilate term to produce said dilation parameter.

19. An apparatus for selectively energizing a motor winding to spin a rotating member, comprising:

a speed sensor for generating a speed signal representing the angular speed of said rotating member; and processing circuitry, in communication with said speed sensor, for determining translation and dilation parameters based upon said speed signal and outputting a conduction angle signal representing the substantially optimal angular position of said rotating member at which to selectively control the delivery of energy to said winding.

20. The apparatus of claim 19, wherein said processing circuitry includes speed processing circuitry, in communication with said speed sensor, that compares said speed signal against a reference speed and generates a speed error signal.

21. The apparatus of claim 19, wherein said processing circuitry includes phase-shifting circuitry that receives and shifts the phase of said conduction angle signal with respect to said speed signal to form multiple phase-shifted conduction angle signals.

22. The apparatus of claim 21, wherein said processing circuitry includes decoding circuitry, in communication with said phase-shifting circuitry, that receives and decodes said multiple phase-shifted conduction angle signals to form multiple conduction angle voltage signals.

23. The apparatus of claim 22, wherein said processing circuitry includes:

drive circuitry, in communication with said decoding circuitry, that receives and conditions said multiple conduction angle voltage signals to form bridge command signals; and bridge circuitry, in communication with said drive circuitry, that receives said bridge command signals and outputs motor control signals to control said motor winding.

24. The apparatus of claim 19, further comprising a temperature sensor, in contact with said winding and said processing circuitry, that determines the temperature of said winding and outputs a temperature signal representing the temperature of said winding.

25. The apparatus of claim 24, wherein said processing circuitry includes temperature processing circuitry, in communication with said temperature sensor, that compares said temperature signal against a reference temperature and generates a temperature error signal.

26. The apparatus of claim 25, wherein said processing circuitry includes temperature error processing circuitry that receives said temperature error signal and outputs a temperature term signal.

27. The apparatus of claim 26, further comprising a voltage sensor, in contact with a supply voltage and said processing circuitry, that determines the supply voltage and outputs a supply voltage signal.

28. The apparatus of claim 27, wherein said processing circuitry includes voltage processing circuitry, in communication with said voltage sensor, that compares said supply voltage signal against a reference voltage and generates a voltage error signal.

29. The apparatus of claim 28, wherein said processing circuitry includes voltage error processing circuitry that receives said voltage error signal and outputs a voltage term signal.

30. The apparatus of claim 29, wherein said processing circuitry includes translation parameter generation circuitry that receives said speed, temperature, and voltage error signals and outputs a translation parameter signal representing said translation parameter.

* * * * *